United States Patent [19]
Bastiaansen

[11] Patent Number: 5,302,661
[45] Date of Patent: Apr. 12, 1994

[54] CONTINUOUS PRODUCTS MADE OF THERMOSETTABLE MONOMERS

[75] Inventor: Cornelius W. M. Bastiaansen, Maastricht, Netherlands

[73] Assignee: DSM N.V., Netherlands

[21] Appl. No.: 808,375

[22] Filed: Dec. 16, 1991

[30] Foreign Application Priority Data

Dec. 14, 1990 [NL] Netherlands .......................... 9002758

[51] Int. Cl.$^5$ .................. C08F 261/04; C08F 263/04; C08F 291/10; C08F 283/06

[52] U.S. Cl. ..................................... 525/59; 525/282; 525/296; 525/298; 525/306; 525/403; 525/426; 525/494; 525/495; 524/494; 524/495; 264/104; 264/210.1; 264/210.7; 264/210.8; 264/288.4; 264/211.24

[58] Field of Search ................. 525/59, 282, 296, 306, 525/403, 426, 298; 264/210.1, 210.7, 210.8, 288.4, 211.24, 104; 524/494, 495

[56] References Cited

U.S. PATENT DOCUMENTS

| | | |
|---|---|---|
| 2,958,672 | 11/1960 | Goldberg . |
| 4,224,427 | 9/1980 | Mueller et al. . |
| 4,298,720 | 11/1981 | Yamazaki et al. . |
| 4,510,111 | 4/1985 | Sawanishi et al. .............. 264/210.1 |
| 4,593,038 | 6/1986 | Burzynski . |
| 4,690,792 | 9/1987 | Matsuda et al. ................ 264/210.7 |
| 4,812,511 | 3/1989 | Domeier . |
| 4,853,449 | 8/1989 | Domeier . |

FOREIGN PATENT DOCUMENTS

| | | |
|---|---|---|
| 0135964 | of 1985 | European Pat. Off. . |
| 0148534 | of 1985 | European Pat. Off. . |
| 0206383 | of 1986 | European Pat. Off. . |
| 0366190 | of 1990 | European Pat. Off. . |
| 61-262707 | of 1986 | Japan . |
| 1057434 | of 1963 | United Kingdom . |

OTHER PUBLICATIONS

Abstract of Germany DD 235 881 A1, as interpreted by applicants-1980.
Abstract of France 2,031,538, as interpreted by applicants-1969.
Abstract of Gernay 30 12 179, as interpreted by applicants-1986.

Primary Examiner—James J. Seidleck
Assistant Examiner—W. R. M. Clark
Attorney, Agent, or Firm—Dressler, Goldsmith, Shore & Milnamow, Ltd.

[57] ABSTRACT

A composition which contains thermosettable monomers from which continuous products can be made without using continuous carrier material, the composition containing bismaleimide monomers and a thermoplastic polymer having a high molecular weight.

Products made from a composition of the present invention are suitable for use in those fields where good temperature resistance, good fire resistance and/or good corrosion and solvent resistance are required in addition to good mechanical properties. Examples are cable sheathing, fire-resistant clothing, asbestos substitutes, high-temperature filters, aircraft interiors, precursors for carbon fiber, food packagings (for example, for use in a microwave oven), capacitor films and filament winding products.

18 Claims, No Drawings

CONTINUOUS PRODUCTS MADE OF THERMOSETTABLE MONOMERS

FIELD OF THE INVENTION

The invention relates to a composition containing thermosettable monomers from which continuous products can be made without using continuous carrier material.

BACKGROUND OF THE INVENTION

As used herein, the phrase "continuous products" shall mean products which have, in principle, an unlimited length in at least one direction, such as fibers, sheets and tubes. The phrase "carrier material" shall mean material which is almost unlimited in length and is used to apply the composition which contains the thermosettable monomers to a substrate and then to cure it, such as thermoplastic sheets or fibers.

A composition from which continuous products can be made without using carrier material is described in JP-A-61/262,707. A composition based on acrylates is described therein which can be processed by a special treatment to produce continuous products, and in particular, to produce optical fibers. In order to achieve this, an acrylate mixture has to be pumped through a tube, in which process the acrylates partially cure in the tube, after which the partially cured acrylates are spun and are cured further.

A disadvantage of a composition as described in JP-A-61/262,707 is that a complicated operation is necessary in order to be able to process the thermosettable monomers continuously because the monomers have to be partially cured in said tube but must not reach their gelling point therein.

The window in which the monomers can be continuously processed is therefore fairly narrow. This requires an accurate adjustment of process conditions and a continuous monitoring of the degree of curing during conveyance through the tube. The consequence is that it is a slow, time-consuming and, consequently, costly process and is always highly susceptible to malfunction.

The object of the present invention is to provide a composition which does not have said disadvantages and can therefore be readily processed to produce continuous products.

SUMMARY OF THE INVENTION

The present invention is directed to a composition that comprises bismaleimide monomers and a thermoplastic polymer having a high molecular weight.

In particular, the thermoplastic polymer is at least partly dissolved in the bismaleimide monomers and is present in a sufficient amount that the composition is spinable.

The composition thus preferably contains from 0.1 to 50 percent by weight, more preferably from 0.1 to 2.5 percent by weight, with respect to the entire composition of the thermoplastic polymer. The thermoplastic polymer has a molecular weight of at least 50,000, preferably in the range of from 50,000 to more than 5,000,000, more preferably in the range of from 900,000 to more than 5,000,000.

The composition preferably contains fibrous material and can be formed into fibers, sheets, and the like.

DETAILED DESCRIPTION OF THE INVENTION

As used herein, the phrase "high molecular weight (HMW)" shall mean a weight averaged molecular weight higher than 50,000 g/mol. Preferably, the molecular weight of the thermoplastic is ultrahigh.

As used herein, the phrase "ultrahigh molecular weight (UHMw)" shall mean higher than 250,000 g/mol.

Because HMW thermoplastic polymer is present, the composition can be processed and molded, for example, in an extruder. In addition, the composition can be stretched. This can be done in one or in two directions. Fibers, sheets and the like can be made herewith.

A further advantage of the invention as related to the known composition from JP-A-61/262,707 is that the composition according to the present invention makes it possible that the product which is obtained therewith only needs to be cured after the spinning, or processing in the extruder, while if a composition according to JP-A-61/262,707 is used, the composition is already partly cured before spinning.

Finally, the fact that polymethyl methacrylate (PMMA) obtained according to JP-A-61/262.707 is readily combustible (i.e. having a low Limiting Oxygen Index (LOI)) while bismaleimides have a high LOI combined with the fact that PMMA has a fairly low glass transition temperature (Tg) while bismaleimides have a high Tg can be considered an advantage. Bismaleimides therefore have much better properties for temperature-sensitive applications.

Spinability will be used as a criterion for the continuous processability in the manner described here. If a composition is spinable, the composition is also deformable to produce other forms of continuous products. Spinability is a concept which is difficult to quantify, but in this description, the definition that will be employed is that given by Ziabicki in Fundamentals of Fibre Formation, J. Wiley & Sons Ltd., London 1976 which states: "A liquid is spinable under the given conditions if a steady-state, continuous lengthening of the liquid can take place without any break occurring."

The "given conditions" are understood here to mean the conditions optimized by the person skilled in the art.

Spinability is established in the experiments by determining whether a thread which is picked up by means of a glass rod from a quantity of test material can be lengthened and wound round a glass rod. This test is described by Ziabicki in the same reference.

Spinability depends, inter alia, on the molecular weight of the thermoplastic polymer. The higher the molecular weight, the less that has to be added in order to cause the viscosity to increase by a certain extent so that the composition becomes spinable.

The thermoplastic polymer is preferably at least partly dissolved in the bismaleimide monomers.

Depending on the choice of the thermoplastic polymer and the monomers and the rate of curing, a molecular blend is produced during curing or phase separation takes place. The latter can result in favorable properties, such as an improvement of the toughness of the final product.

In general, it will be advantageous to add the thermoplastic polymer in the form of small particles (having an average diameter of less than 0.5 mm) because the dissolution of the thermoplastic polymer in the monomers is thereby facilitated. It is also possible to heat the thermoplastic polymer before it is added to the composition.

In this connection it should be pointed out that a large dissolution rate of the polymer is not a condition for carrying out a process according to the invention.

The composition preferably comprises 0.1 to 50 by weight, with respect to the entire composition, of thermoplastic having a molecular weight of 50,000 to higher than 5,000,000.

The term "molecular weight (MW)," as used herein, refers to the weight averaged molecular weight as measured with e.g. Gel permeation chromatography with polystyrene standards.

The composition more preferably comprises 0.1 to 2.5 percent by weight, with respect to the entire composition, of the thermoplastic polymer having a molecular weight of 900,000 to more than 5,000,000. It is to be understood that generally a smaller amount of a higher molecular weight thermoplastic polymer will be needed than if a lower molecular weight thermoplastic polymer is utilized.

The minimum amount of thermoplastic polymer which has to be added to obtain a continuously processable composition is also dependent on the type of thermoplastic polymer. In general, less has to be added of thermoplastic polymers which are of relatively high viscosity above their melting point than of thermoplastic polymers which are of relatively low viscosity above their melting point. For example, more will in general be needed of a branched thermoplastic polymer than of a linear thermoplastic polymer. In general, the required properties of the composition will be determined by the average chain length of the thermoplastic polymer dissolved therein. That is to say, a lower percentage by weight of, for example, polyethylene oxide (PEO) having a particular molecular weight than of, for example, polyvinyl acetate (PVA) is satisfactory. PEO is, after all, less heavy per unit chain length than PVA because PEO has no side groups and PVA has.

It is possible to add higher percentages of thermoplastic polymer. The properties of the product may, however, be disadvantageously influenced by the thermoplastic polymer. As a result, it is generally desirable to keep the quantity of thermoplastic polymer as small as necessary to give the desired properties.

The mixing of a thermoplastic polymer into a liquid before polymerization in order to cause the viscosity to increase has already been described in GB-A-1,057,434. This patent relates to the non-dissolution of a polymer in its own monomers. There is no suggestion in the patent specification that it would be advantageous to add thermoplastic polymer to a thermosetting system based on bismaleimide.

GB-A-1,057,434 does describe the possibility of adding a small quantity of monomer which can ensure a certain degree of crosslinking to a newtonian liquid consisting primarily of acrylonitrile monomers, but with this addition only a low crosslinking density is achieved. A product having such a low cross-linking density is not included among the thermosets. A product produced according to the method from GB-A-1,057,434 will also not have the outstanding properties which a product according to the present invention has.

A known manner of making continuous products from thermosetting monomers is to coat carrier material such as continuous or semicontinuous fibers with thermosetting monomers. In the case of products having a carrier fiber, it is virtually impossible to stretch the products. The material is in that case processed by coextrusion or pultrusion.

EP-A-148,534 describes how a thermoplastic polymer can also be added to a composition which contains bismaleimides. According to EP-A-148,534, adding the thermoplastic polymer has a positive effect on the viscosity and the film strength. EP-A-148,534 does not, however, describe the fact that it is advantageous to use a thermoplastic polymer having a high molecular weight or that continuous products can be made from the composition without using a carrier material. EP-A-148,534 is directed to a bismaleimide for use as a matrix material in certain -reinforced materials, the so-called "advanced composites" and is consequently not relevant to the invention.

The thermoplastic polymers useful in the compositions of the present invention can be chosen from all the thermoplastic polymers which can be produced with a high molecular weight and are compatible with (i.e. at least partly soluble in) the bismaleimide to be used, e.g. polyethylene oxides, polypropylene oxides, styrene-maleic anhydride-acrylonitrile copolymers, polyarylamides, polyacrylamides, polyacrylates or polyvinyl acetates. Preferably polymers are chosen which are obtainable with extremely high molecular weights, e.g. polyethylene oxide or polyvinyl acetate.

The bismaleimide monomers may e.g. be monomers as described in EP-A-206,383, EP-A-135,964, EP-A-148,534, U.S. Pat. No. 4,298,720 or U.S. Pat. No. 4,224,427.

EP-A-135,964 describes a bismaleimide composition containing 80 to 30% by weight of (a mixture of) components having a formula:

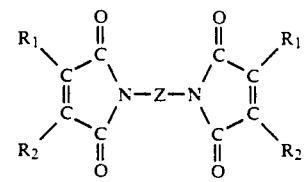

and/or:

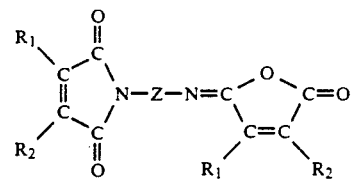

and/or:

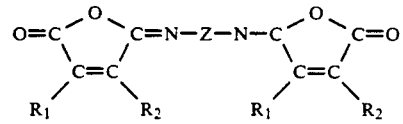

wherein $R_1$ and $R_2$ each independently represent a hydrogen atom, an aliphatic, cycloaliphatic or aromatic group containing 1-12 carbon atoms, or a halogen atom, or wherein $R_1$ and $R_2$, together with the carbon atoms to which they are joined, form a ring structure having at least one polymerisable double C—C bond, while Z represents a bivalent organic group.

EP-A-135,964 further discloses compositions comprising 5 to 60% by weight of a mixture of components having the general formula:

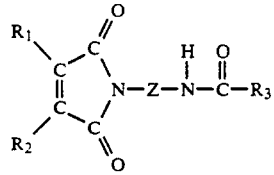
IV and/or:

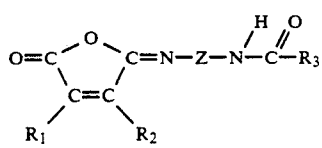
V wherein $R_1$ and $R_2$ each independently represent a hydrogen atom, an aliphatic, cycloaliphatic or aromatic group containing 1-12 carbon atoms or a halogen atom, or wherein $R_1$ and $R_2$, together with the carbon atoms to which they are joined, form a ring system having at least one polymerisable C—C bond, while Z represents a bivalent organic group and $R_3$ an optionally substituted alkyl, cycloalkyl, aralkyl or alkylaryl group containing 1-12 carbon atoms in the alkyl section.

Usable according to the invention, in particular, are those components wherein $R_1$ and $R_2$ are each an optionally substituted alkylene group containing 2-25 carbon atoms or an optionally substituted m- or p-phenylene group, Z is an optionally substituted group having the formula:

VIII wherein Y represents a —$CH_2$—, a —$C(CH_3)_2$—, an —O— or a —$SO_2$— group and $R_3$ is an alkyl group containing 1 to 6 carbon atoms.

The distribution of the free bonds of the Z group as shown in formula VIII indicates that said bonds may be located in the o-, m- or p-position with respect to the Y group.

Readily usable according to the invention are the (iso)maleimide components having formulae I, II and/or III and (iso)maleimide-amide components having formula IV and/or formula V wherein the Z group is chosen from

—$CH_2$—$CH_2$—
—$(CH_2)_6$—

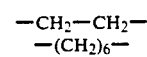,

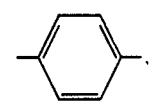,

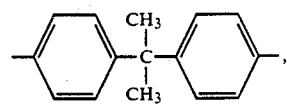,

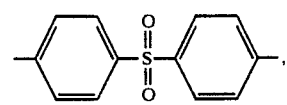,

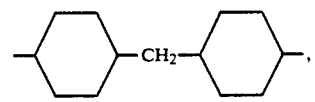,

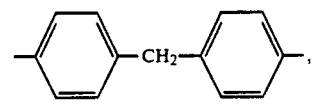, wherein $R_1$ and $R_2$ represent hydrogen atoms and wherein $R_3$ represents an alkyl group containing 1-6 carbon atoms.

Preferably, bismaleimide components are used which contain one or more components having the formula:

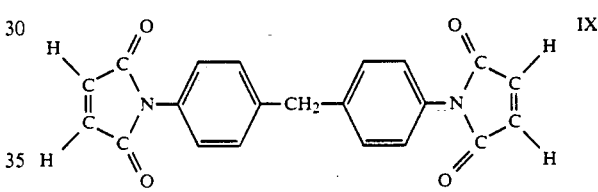
IX and/or:

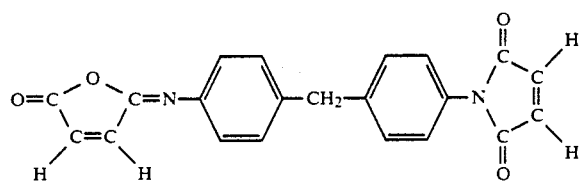

and/or:

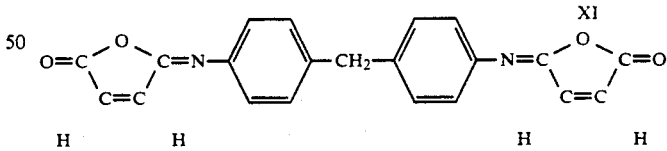
XI and furthermore, as maleimide-amide component, one or more of the components having the formula:

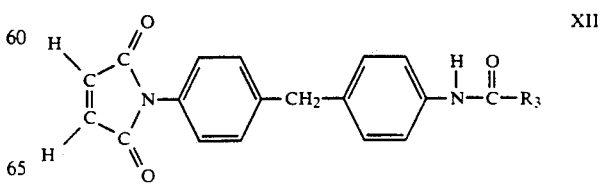
XII and/or:

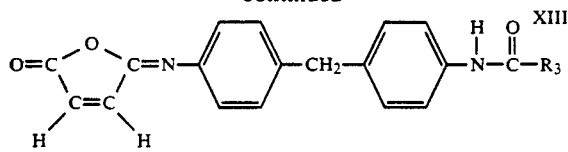

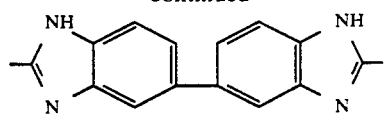

wherein $R_3$ represents an alkyl group containing 1-6 carbon atoms, preferably methyl, and furthermore a maleic anhydride as maleic anhydride derivative.

The compositions according to the invention which contain bismaleimide compounds, maleimide-amide compounds and an acid anhydride compound contain from 80 to 30% by weight, preferably from 75 to 45% by weight, of the bismaleimide compounds, from 5 to 60% by weight, preferably 20 to 40% by weight, of the maleimide-amide compounds and from 1 to 10% by weight, preferably from 2 to 7% by weight, of the maleic anhydride derivative and preferably maleic anhydride.

U.S. Pat. No. 4,298,720 describes a resin which contains (a) a bismaleimide according to formula (I), wherein $R_1$, $R_2$, $R_3$ and $R_4$ are hydrogen atoms, halogen atoms, unbranched or branched alkyl groups containing 1 to 5 carbon atoms or phenyl groups and the groups which are denoted by $R_1$, $R_2$, $R_3$ and $R_4$ may be identical to, or different from, one another, and Z is an organic group of 2 or more carbon atoms selected from aliphatic, alicyclic, aromatic and heterocyclic groups and combinations thereof or a combination of an organic group such as defined above containing —O—, —S—, —S—S—, —CO—, —SO—, —SO$_2$—, —CO$_2$, —N=N—, —NH—, or —CONH—.

Specific examples of the groups for which Z stands in formula (I) comprise two or more phenylene or cyclohexylene groups joined together by a simple valency bond or by an atom or by an inert group selected, for example, from —O—, —S—, alkylene groups containing 1 to 3 carbon atoms, —CO—, —SO$_2$—, —NR$_{15}$—, —N=N—, —CONH—, —P(O)R$_{15}$, —CONH—X$_1$—, —CONH—,

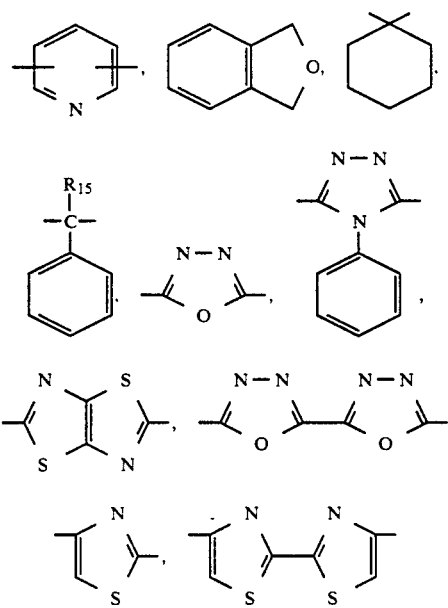

wherein $R_{15}$ is a hydrogen atom, an alkyl radical containing 1 to 4 carbon atoms, a phenyl group, or a cyclohexyl group and wherein $X_1$ is an alkylene group containing up to 13 carbon atoms. Any phenylene or cyclohexylene group may have one or more substituents, such as methyl groups.

U.S. Pat. No. 4,224,427 describes a bismaleimide having the formula XIV:

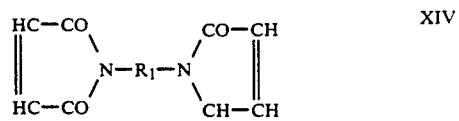

wherein $R_1$ is a polycondensate chain having a molecular weight of between 200 and 8,000 and containing hydrocarbon residues which are joined to one another via ether, ester, amide or urea bonds or $R_1$ is a polysiloxane having a molecular weight (MW) of between 400 and 8,000.

In order to lower the viscosity, an ethylenically unsaturated compound, for example, can be added as a thinner. This may be a bismaleimide oligomer or an ethylenically unsaturated monomer containing less than 30 carbon atoms. The ethylenically unsaturated monomer chosen may be a monomaleimide compound or an aromatic or aliphatic mono- or diamine. These are described, for example, in EP-A-135,964, DE-A-3,012,179, FR-A-2,031,538 and U.S. Pat. No. 4,593,038. Vinylaromatic compounds, alkyl (meth)acrylate, hydroxyalkyl (meth)acrylate, divinyl and diand triallyl compounds can also be used. Examples are styrene, α-methylstyrene, p-methylstyrene, chlorostyrene, hydroxy- or aminoalkylstyrene, hexyl (meth)acrylate, ethyl (meth)acrylate, hydroxyethyl (meth)acrylate, divinylbenzene, diallyl cyanurate, triallyl isocyanurate, triallyl cyanurate, divinyl maleate, trimethylolpropylene, triacylate, etc. Other suitable monomers are maleic anhydride and unsaturated epoxy compounds such as are described in, for example, DD-A-235,881.

Preferably, styrene and/or hydroxyethyl (meth)acrylate (HEMA) is added to lower the viscosity. Both monomers are capable of copolymerizing with the bismaleimide. Instead of, or together with, HEMA, a phosphate ester of HEMA (2-(meth)acryloxyethyl phosphate) can also be used. This has the advantage that the flammability is increased to a lesser extent by adding further viscosity-lowering agents. This is described e.g. in EP-A-366.190, hereby incorporated by reference.

Another reactive thinner is trialkyl isocyanurate. The thinners are in general added in a quantity such that the viscosity of the composition becomes sufficiently low for the composition to be processable by means of a method such as described in the introduction to this description.

The following can furthermore be added: epoxy compounds, initiators, such as peroxide (for example, tertiary butyl perbenzoate or cumyl hydroperoxide), accelerators, inhibitors, flexibilizers (for example, acrylonitrile-butadiene rubbers) and/or surface-active substances.

Low-molecular-weight thermoplastic polymers can also be added to the composition in order to improve certain properties such as impact strength.

Standard additives, such as inhibitors, promoters, accelerators, flexibilizers, lubricants, release agents, antioxidants, pigments, surface-active substances, cross-linkers, fillers or fiber reinforcements can furthermore be added to the composition.

A correct choice of the monomers and the thermoplastic makes it possible to achieve the result that the thermoplastic polymer also fulfills the roll of a so-called 'low-profile additive' in addition to that of making the monomer solution spinable.

The curing can be initiated in all of the standard ways for bismaleimides, such as thermally or with electromagnetic radiations such as electron or gamma radiation.

A possible method of making products of a composition according to the invention is the following:

The thermoplastic polymer is suspended and eventually dissolved in the bismaleimide monomers. To do this, it may be necessary to heat the composition to a suitable temperature, for example, between 50° and 200° C. Preferably, the composition is not heated above the temperature at which the viscosity-lowering compounds in the composition start to boil. The mixture is then extruded or spun and then partially or completely cured.

A possible way of combining thermoplastic polymer and bismaleimide monomers is mixing an amount of thermoplastic polymer particles into the low viscosity monomers at a low temperature thereby forming a low viscosity suspension. The low viscosity suspension can easily be pumped into e.g. an extruder. In the extruder the suspension is heated up and the thermoplastic polymer dissolves, thereby increasing the viscosity. From this extruder filaments are extruded and cured afterwards.

Additional steps in this method may be to mix reinforcements, such as fibers into the composition and to stretch the extruded or spun intermediates.

As used herein, the term "strengthening fibers" means fibers that have properties that are such that they improve the properties of the product in which those fibers are incorporated. Strengthening fibers will normally not melt or otherwise lose their mechanical strength under the processing conditions. Examples are glass fibers and carbon fibers, but any other fiber can be used.

The viscoelasticity of the composition can be adjusted as a function of the chosen processing method. If spinning in the downward direction is opted for, a lower percentage by weight or a lower molecular weight of thermoplastic polymer may be sufficient than in the case of, for example, film blowing, the so-called "blow molding" in the upward direction.

If it is desired to produce thin products, it is advisable to stretch the composition, in particular before curing. If fibrous fillers have been added, and it is desired that they be present in oriented form in the product, it is also advisable to stretch before curing. If anisotropy is desired in the final product, it is preferable to stretch after or during curing. Although the product consists of a densely crosslinked three-dimensional network after curing, it can always still be stretched to some extent.

Preferably, the composition is stretched uniaxially to produce fiber having a thickness of less than 1 mm or biaxially to produce a sheet having a thickness of less than 1 mm.

If the composition is cured by supply of heat, it can be advantageous to perform the curing in a bath filled with a liquid which is inert during the curing reaction and has a specific gravity which is virtually equal to the specific gravity of the composition.

It is possible to cause the curing to take place under the influence of a catalyst and/or initiator which is contained in said inert liquid and diffuses into the composition therefrom.

It is possible to postcure the products. This may yield products having still better properties, especially still better high-temperature properties.

Products made from a composition according to the present invention are suitable for uses in those fields where good temperature resistance, good flame resistance and/or good corrosion and solvent resistance are required in addition to good mechanical properties. Examples are cable sheathing, fire-resistant clothing, asbestos substitutes, high-temperature filters, high temperature film or flexible printed circuits, aircraft interiors, precursors for carbon fiber, food packagings (for example for use in a microwave oven), capacitor films and filament winding products. In this connection it is very advantageous that the composition according to the invention does not have to be processed at a high temperature, something which is in fact necessary in the case of, for example, thermoplastic polymers having a high temperature resistance. In particular, the invention is advantageous where sheets, films, fibers, tubes or other continuous products having one or more of the qualities described above are required. The fibrous products may furthermore be produced as a bundle of thin filaments or as a thicker monofilament. It is possible to reduce the size of products according to the invention by cutting, sawing, breaking or such methods to produce products which have a shorter length.

The present invention will be illustrated by reference to the following examples and comparative experiments without being limited thereto.

Tensile-strength tests on fibers were carried out at room temperature on a Zwick Tensile Tester equipped with fiber clamps. The initial length of the fiber was 50 cm, and the testing speed was 5 cm/min. The (Young's) modulus, the tensile strength $\sigma$ and the elongation at break were determined from the measured stress-elongation curve.

The specification of the manufacturer was used for the molecular weight of the thermoplastic polymer.

EXAMPLES 1 AND 2

Determination of the percentages of thermoplastic needed for spinability

Polyethylene oxide (PEO) having weight averaged molecular weights of 100,000, 300,000, 600,000 and 5,000,000 according to the manufacturers specification was obtained from Aldrich Chemie, FRG.

The bismaleimide resin was a BMI TP968 VG$^R$ from DSM, Holland, mixed in a proportion of 70/30 by weight with triethylene glycol methacrylate.

Three different molecular weights of PEO were suspended in the bismaleimide monomers in diverse concentrations at room temperature. The different molecular weights and concentrations are listed in Table 1. The PEO was dissolved in the monomers at a temperature of 120° C. in a Brabender kneader.

The solution was transferred to small dishes, after which the small dishes were brought to two different temperatures, viz. 23° C. in Example I and 60° C. in Example II.

Attempts were made to pick up a thread of material from each dish, after which attempts were made to wind this thread around a glass rod horizontally above the small dish. The glass rod was in a slow rotating motion.

In the tables below, moderate spinability is understood to mean that it was possible only after several attempts and very careful handling to pick up such a thread from the solution, wind it around the spindle, and continuously withdraw a thread.

TABLE 1

| Molecular weight (g/mol) | Thermoplastic concentration (% by weight) | Spinability I (23° C.) | Spinability II (60° C.) |
|---|---|---|---|
| $10^5$ | 1 | −+ | −− |
| $10^5$ | 5 | −+ | − |
| $10^5$ | 10 | −+ | −+ |
| $3 \times 10^5$ | 1 | ++ | −+ |
| $3 \times 10^5$ | 5 | ++ | ++ |
| $3 \times 10^5$ | 10 | ++ | ++ |
| $6 \times 10^5$ | 1 | ++ | + |
| $6 \times 10^5$ | 5 | ++ | ++ |
| $6 \times 10^5$ | 10 | ++ | ++ |
| $5 \times 10^6$ | 0.5 | ++ | + |
| $5 \times 10^6$ | 1 | ++ | ++ |
| $5 \times 10^6$ | 5 | ++ | ++ |

The check for spinability at 23° C. was made on the cooled blends after the PEO has been completely dissolved. The concentration of the thermoplastic polymer is given in percent by weight with respect to the total composition. Spinability is measured by the test method as described above, — meaning very poorly spinable, − meaning poorly spinable, ± meaning moderately spinable, + meaning readily spinable and + + meaning very readily spinable.

In the table it can be seen that a lower percentage of thermoplastic polymer having a higher molecular weight is necessary to render the solution spinable than of thermoplastic polymer having a lower molecular weight.

In the table it can be seen that, at higher processing temperatures, relatively more has to be added to render the solution spinable.

The invention relates preferably to a composition which contains such a large percentage of thermoplastic polymer of a certain molecular weight that the composition is spinable at its desired processing temperature. Thus, the composition contains at least 1% by weight of a thermoplastic polymer having a molecular weight of 100,000 for a desired processing temperature of 23° C.

For a required processing temperature of 60° C., the composition preferably contains 10% by weight of the thermoplastic polymer having a molecular weight of 100,000.

However, the quantities described above are valid here for PEO with the given bismaleimide. If other compositions containing bismaleimide and/or other HMW polymers are used, the numbers will probably reveal a different picture. The guidelines described above give a clear indication of how the invention can be used in analogous cases.

COMPARATIVE EXPERIMENT A

The method of Example I and II was repeated without mixing PEO into the bismaleimide monomers. Whether the solution is spinable at a temperature of 23° or 60° C. to produce a fiber was then again investigated. This was not the case.

EXAMPLE III

The method of Example II was repeated, in which polyvinyl acetate (PVA, Mowilith 70A from Hoechst Aktiengesellschaft, West Germany) was suspended and dissolved in bismaleimide monomers. The molecular weight of PVA was $1 \times 10^6$ and the concentration 15%. Whether the solution is spinable to produce a fiber was investigated. This proved to be possible.

EXAMPLE IV

The method of Example I was repeated, 5% by weight of PEO having a molecular weight of 600,000 being mixed in.

The solution was spun at 100° C. The fiber was wound onto a rod.

A piece of fiber was irradiated with a 10 MRad electron beam under an $N_2$ atmosphere.

A tensile-strength test carried out on the cured fiber yielded $E = 3$ GPa and $\sigma = 50$ MPa.

COMPARATIVE EXPERIMENT B

An attempt was made in the same way as in Example III to spin a fiber with bismaleimide monomers but without PEO being dissolved in it. This was found to be impossible.

I claim:

1. A composition suitable for producing continuous products without using continuous carrier material, comprising at least 50% by weight with respect to the entire composition of bismaleimide monomers and a high molecular weight thermoplastic polymer having a weight average molecular weight of at least 50,000 that is soluble in said monomers, the polymer being present in an amount sufficient to make the mixture spinable.

2. The composition according to claim 1, wherein the weight average molecular weight of the thermoplastic polymer ranges from 900,000 to 5,000,000, the amount of said polymer ranging from 2.5% to 0.1% by weight with respect to the entire composition.

3. A composition comprising from about 0.5 to about 10 percent by weight with respect to the entire composition of polyethylene oxide having a molecular weight of from about 100,000 to about 5,000,000 at least partly dissolved in at least one bismaleimide monomer.

4. The composition of claim 3 that further comprises triethylene glycol methacrylate.

5. The composition of claim 3 that further comprises fibrous material.

6. The composition according to claim 1 wherein the thermoplastic polymer is chosen from the group consisting of polyethylene oxides, polyamides, styrene-maleic anhydride-acrylonitrile copolymers, poly-propylene oxides, polyvinyl alcohols, and polyvinyl acetates.

7. The composition according to claim 1 wherein the composition further comprises fibrous material.

8. A method for making a continuous product without using a continuous carrier material wherein a composition according to claim 1 is heated to a temperature at which the thermoplastic polymer dissolves at least partly, the composition is extruded or spun and then is at least partly cured.

9. The method according to claim 8 wherein the bismaleimide is completely or partially cured in a bath filled with a liquid which is enert during the curing reaction and has a specific gravity which is virtually equal to the specific gravity of the composition.

10. The method according to claim 9 wherein the inert liquid contains a catalyst which is suitable for curing bismaleimide monomers and is capable of diffusing into the composition.

11. The method according to claim 8 wherein the composition is uniaxially or biaxially stretched before, during or after the at least partial curing of the bismaleimide monomers.

12. The method according to claim 11 wherein the composition is uniaxially stretched to produce a fiber having a thickness of less than 1 mm.

13. The method according to claim 11 wherein the composition is biaxially stretched to produce a sheet having a thickness of less than 1 mm.

14. The method according to claim 8 wherein the composition is postcured.

15. A continuous product obtained by at least partially curing a composition according to claim 1.

16. A continuous product obtained by the method of claim 8.

17. A continuous product according to claim 15 wherein the product is a fiber.

18. A continuous product according to claim 16 wherein the product is a fiber.

* * * * *